(12) United States Patent
Eckerdal et al.

(10) Patent No.: US 11,722,539 B2
(45) Date of Patent: *Aug. 8, 2023

(54) SYSTEM AND METHOD FOR CLIENT-INITIATED PLAYLIST SHUFFLE IN A MEDIA CONTENT ENVIRONMENT

(71) Applicant: Spotify AB, Stockholm (SE)

(72) Inventors: Per Eckerdal, Stockholm (SE); Lukas Polacek, Zurich (CH)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,209

(22) Filed: Nov. 23, 2021

(65) Prior Publication Data

US 2022/0150291 A1    May 12, 2022

Related U.S. Application Data

(63) Continuation of application No. 16/859,698, filed on Apr. 27, 2020, now Pat. No. 11,218,526, which is a
(Continued)

(51) Int. Cl.
*H04L 65/612* (2022.01)
*G06F 16/638* (2019.01)
(Continued)

(52) U.S. Cl.
CPC ............. *H04L 65/612* (2022.05); *G06F 7/76* (2013.01); *G06F 16/4387* (2019.01); *G06F 16/639* (2019.01); *H04L 67/01* (2022.05)

(58) Field of Classification Search
CPC ......... H04L 65/612; H04L 67/01; G06F 7/76; G06F 16/4387; G06F 16/639
See application file for complete search history.

(56) References Cited

U.S. PATENT DOCUMENTS 6,031,797 A    2/2000  Van Ryzin
7,558,687 B1 *  7/2009  Bode ................ G05B 21/02
                                                   702/182
(Continued)

FOREIGN PATENT DOCUMENTS

EP    2381372 A1    10/2011
EP    2469882 A2     6/2012

OTHER PUBLICATIONS

Key J's Blog, "The art of shuffling music", retrieved from http://keyj.emphy.de/balanced-shuffle/ on Jan. 15, 2020, 6 pages.
(Continued)

*Primary Examiner* — Abdullahi E Salad
(74) *Attorney, Agent, or Firm* — Morgan, Lewis & Bockius LLP

(57) ABSTRACT

In accordance with an embodiment, described herein is a system and method for client-initiated playlist shuffle in a media content environment. A shuffle logic is configured to provide a shuffle order for a plurality of media content items, including associating each media content item with a placement interval within which the media content item can be placed, and a weight that determines the average position of the placement interval; associating each media content item with a random value that indicates a random offset or position within its placement interval; calculating an ordering score for each media content item based on its weight plus its random offset into its placement interval; collecting indications for the plurality of media content item that reflect their ordering scores; and placing the plurality of media content items into the shuffle order, for subsequent playback by a media device.

15 Claims, 7 Drawing Sheets

Related U.S. Application Data continuation of application No. 15/048,654, filed on Feb. 19, 2016, now Pat. No. 10,659,504.

(51) Int. Cl.
  *G06F 16/438* (2019.01)
  *G06F 7/76* (2006.01)
  *H04L 67/01* (2022.01)

(56) References Cited

U.S. PATENT DOCUMENTS

| | | | |
|---|---|---|---|
| 7,647,131 B1* | 1/2010 | Sadowski | G05B 23/0297 |
| | | | 702/181 |
| 8,285,404 B1 | 10/2012 | Kekki | |
| 9,286,942 B1 | 3/2016 | Hayes | |
| 2006/0112098 A1 | 5/2006 | Renshaw | |
| 2006/0153040 A1 | 7/2006 | Girish | |
| 2006/0212478 A1 | 9/2006 | Plastina et al. | |
| 2006/0218187 A1 | 9/2006 | Plastina | |
| 2007/0006271 A1 | 1/2007 | Janus | |
| 2007/0025194 A1 | 2/2007 | Morse | |
| 2007/0156679 A1 | 7/2007 | Kretz | |
| 2007/0168388 A1 | 7/2007 | Plastina | |
| 2007/0244880 A1 | 10/2007 | Martin | |
| 2008/0178663 A1* | 7/2008 | Yang | G01N 1/10 |
| | | | 73/61.41 |
| 2009/0049045 A1 | 2/2009 | Askey | |
| 2009/0055759 A1 | 2/2009 | Svendsen | |
| 2009/0063976 A1 | 3/2009 | Bull | |
| 2009/0082919 A1* | 3/2009 | Hershey | F02D 41/28 |
| | | | 701/33.4 |
| 2009/0089558 A1* | 4/2009 | Bradford | G05B 21/02 |
| | | | 712/225 |
| 2010/0071073 A1 | 3/2010 | Janus | |
| 2010/0198767 A1 | 8/2010 | Farrelly | |
| 2010/0260489 A1 | 10/2010 | Okada et al. | |
| 2011/0087665 A1 | 4/2011 | Weare | |
| 2011/0302493 A1 | 12/2011 | Runstedler | |
| 2012/0029314 A1* | 2/2012 | Paquet | A61B 5/0002 |
| | | | 600/301 |
| 2012/0042245 A1 | 2/2012 | Askey | |
| 2012/0215331 A1 | 8/2012 | Naftolin | |
| 2012/0224828 A1 | 9/2012 | Silber et al. | |
| 2012/0271882 A1 | 10/2012 | Sachdeva | |
| 2012/0278342 A1 | 11/2012 | Purdy | |
| 2012/0290932 A1 | 11/2012 | Johnson | |
| 2012/0315012 A1 | 12/2012 | Mees | |
| 2013/0110848 A1 | 5/2013 | Svendsen | |
| 2014/0052770 A1 | 2/2014 | Gran | |
| 2014/0074959 A1 | 3/2014 | Alsina | |
| 2014/0077964 A1* | 3/2014 | Beligere | E21B 47/06 |
| | | | 340/853.3 |
| 2014/0089024 A1* | 3/2014 | Mason | G06Q 10/0631 |
| | | | 705/7.12 |
| 2014/0222831 A1 | 8/2014 | Ramkumar | |
| 2015/0046267 A1 | 2/2015 | MacTiernan | |
| 2015/0169581 A1 | 6/2015 | Pusateri | |
| 2015/0268800 A1 | 9/2015 | O'Konski | |
| 2015/0358375 A1 | 12/2015 | Coburn, IV | |
| 2016/0232451 A1 | 8/2016 | Scherzer | |
| 2016/0365936 A1 | 12/2016 | Boulter | |
| 2017/0139671 A1 | 5/2017 | Gilbert | |
| 2017/0208110 A1 | 7/2017 | Coburn, IV | |
| 2017/0230438 A1 | 8/2017 | Turkoglu | |
| 2017/0272486 A1 | 9/2017 | Drapeau | |

OTHER PUBLICATIONS

Eckerdal, Office Action, U.S. Appl. No. 15/048,654, dated Jan. 16, 2018, 14 pgs.
Eckerdal, Final Office Action, U.S. Appl. No. 15/048,654, dated Nov. 30, 2018, 10 pgs.
Eckerdal, Office Action, U.S. Appl. No. 15/048,654, dated Jun. 27, 2019, 13 pgs.
Eckerdal, Notice of Allowance, U.S. Appl. No. 15/048,654, dated Jan. 17, 2020, 8 pgs.
International Search Report and Written Opinion issued by European Patent Office for PCT Application No. PCT/EP2017/053509, dated Mar. 29, 2017, 24 pgs.
International Preliminary Report on Patentability issued for PCT Application No. PCT/EP2017/053509, dated Apr. 23, 2018, 9 pgs.
Polacek, Lukas; Spotify Labs: Spotify's Engineering and Technology Blog, "How to shuffle songs?", published on Feb. 28, 2014, retrieved from https://labs.spotify.com/2014/02/28/how-to-shuffle-songs/ on Jan. 15, 2020, 13 pages.
Wikipedia, "Fisher-Yates shuffle", retrieved from https://en.wikipedia/org/wiki/Fisher-Yates_shuffle on Jan. 15, 2020, 11 pages.
Written Opinion of the International Preliminary Examining Authority dated Jan. 29, 2018 for PCT Application No. PCT/EP2017/053509, 9 pgs.
Eckerdal, Office Action, U.S. Appl. No. 16/859,698, dated Feb. 19, 2021, 23 pgs.
Eckerdal, Notice of Allowance, U.S. Appl. No. 16/859,698, dated Aug. 26, 2021, 8 pgs.

* cited by examiner

SYSTEM AND METHOD FOR CLIENT-INITIATED PLAYLIST SHUFFLE IN A MEDIA CONTENT ENVIRONMENT

CLAIM OF PRIORITY

This application is a continuation application of U.S. patent application Ser. No. 16/859,698, filed Apr. 27, 2020, entitled "SYSTEM AND METHOD FOR CLIENT-INITIATED PLAYLIST SHUFFLE IN A MEDIA CONTENT ENVIRONMENT", which is a continuation application of U.S. patent application Ser. No. 15/048,654, filed Feb. 19, 2016, now U.S. Pat. No. 10,659,504, entitled, "SYSTEM AND METHOD FOR CLIENT-INITIATED PLAYLIST SHUFFLE IN A MEDIA CONTENT ENVIRONMENT", all which are incorporated by reference in their entireties.

FIELD OF INVENTION

Embodiments of the invention are generally related to the providing of media content, or other types of data, and are particularly related to a system and method for client-initiated playlist shuffle in a media content environment.

BACKGROUND

Today's consumers enjoy the ability to access a tremendous amount of media content, such as music and videos, at any location or time of day, using a wide variety of media devices. In a media content environment which supports playlists of media content items, such as songs, music, videos, or other types of media content, whenever a user selects shuffled play of a number of media content items, for example within an artist page or a playlist, the resultant play order of those media content items should appear somewhat random. Additionally, the shuffling should be sufficiently stable so that, for example, the addition or deletion of songs to a playlist by another person actively curating that playlist, has minimal disruption on the listening experience. These are some examples of the types of environments in which embodiments of the invention can be used.

SUMMARY

In accordance with an embodiment, described herein is a system and method for client-initiated playlist shuffle in a media content environment. A shuffle logic is configured to provide a shuffle order for a plurality of media content items, including associating each media content item with a placement interval within which the media content item can be placed, and a weight that determines the average position of the placement interval; associating each media content item with a random value that indicates a random offset or position within its placement interval; calculating an ordering score for each media content item based on its weight plus its random offset into its placement interval; collecting indications for the plurality of media content item that reflect their ordering scores; and placing the plurality of media content items into the shuffle order, for subsequent playback by a media device.

DETAILED DESCRIPTION

As described above, in a media content environment which supports playlists of media content items, such as songs, music, videos, or other types of media content, whenever a user selects shuffled play of a number of media content items, for example within an artist page or a playlist, the resultant play order of those media content items should appear somewhat random. Additionally, the shuffling should be sufficiently stable so that, for example, the addition or deletion of songs to a playlist by another person actively curating that playlist, has minimal disruption on the listening experience.

In accordance with an embodiment, described herein is a system and method for client-initiated playlist shuffle in a media content environment. A shuffle logic is configured to provide a shuffle order for a plurality of media content items, including associating each media content item with a placement interval within which the media content item can be placed, and a weight that determines the average position of the placement interval; associating each media content item with a random value that indicates a random offset or position within its placement interval; calculating an ordering score for each media content item based on its weight plus its random offset into its placement interval; collecting indications for the plurality of media content item that reflect their ordering scores; and placing the plurality of media content items into the shuffle order, for subsequent playback by a media device.

In accordance with an embodiment, the shuffle logic is provided within a media device operating as a client device and configured to control the playback of media content received from a media server; wherein the media device includes a user interface that enables a user to select from a plurality of media options to be played at the client device or at a controlled client device; and wherein in response to receiving a request for a client-initiated shuffle, the shuffle logic at the media device operating as a client device shuffles the set of media content prior to it being played at the client device or at the controlled client device.

In accordance with an embodiment, the shuffle logic is provided within a media server configured to receive requests for media content from a media device operating as a client device and configured to control the playback of media content received from the media server; and wherein in response to receiving a request for a client-initiated shuffle, the shuffle logic at the media server shuffles the set of media content prior to it being provided for playing.

In accordance with an embodiment, each of the media options is associated with a media content that is one of a song, music or other item of media content.

The above and additional embodiments are described in further detail below.

Media Content Environment

Figure 1:
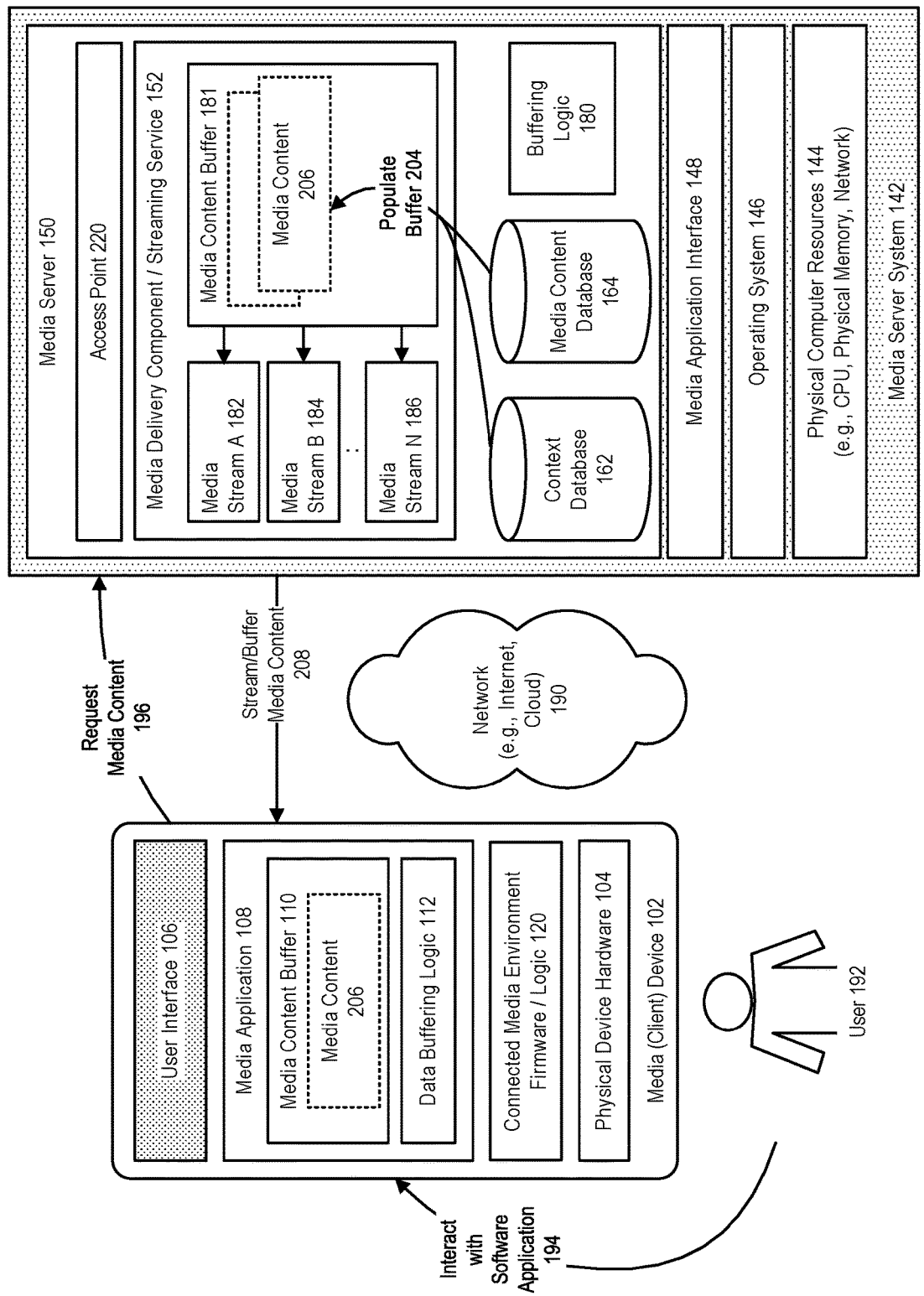
FIG. 1 illustrates an example of a system for providing media content, in accordance with an embodiment.

FIG. 1 illustrates an example of a system for providing media content, in accordance with an embodiment.

As illustrated in FIG. 1, in accordance with an embodiment, a media device 102, operating as a client device, can receive and play media content provided by a backend media server system 142 (media server), or by another system or peer device. In accordance with an embodiment, the client device can be, for example, a personal computer system, handheld entertainment device, tablet device, smartphone, television, audio speaker, in-car entertainment system, or other type of electronic or media device that is adapted or able to prepare a media content for presentation, control the presentation of media content, and/or play or otherwise present media content.

In accordance with an embodiment, each of the client device and the media server can include, respectively, one or more physical device or computer hardware resources 104, 144, such as one or more processors (CPU), physical memory, network components, or other types of hardware resources.

Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In accordance with an embodiment, the client device can optionally include a user interface 106, which is adapted to display media options, for example as an array of media tiles, thumbnails, or other format, and to determine a user interaction or input. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a media application 108, together with an in-memory client-side media content buffer 110, and a data buffering logic 112, which can be used to control the playback of media content received from the media server, for playing either at a requesting client device (i.e., controlling device) or at a controlled client device (i.e., controlled device), in the manner of a remote control. A connected media environment firmware/logic 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment which supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone as a controlling client device, and their audio speaker as a controlled client device to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state which is then synchronized with other devices as needed.

For example, in accordance with an embodiment, when the destination client device to which the media content is being streamed changes, from a controlling device to a controlled device, or from a first controlled device to a second controlled device, then the media server can transmit context information associated with an active media content to the newly-appointed destination device, for use by that device in playing the media content.

In accordance with an embodiment, a media content database 164 can include media content, for example music, songs, videos, movies, or other media content, together with metadata describing that media content. The metadata can be used to enable users and client devices to search within repositories of media content, to locate particular media content items.

In accordance with an embodiment, a buffering logic 180 can be used to retrieve or otherwise access media content items, in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device, and issue requests to access media content, for example the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content, 206 including one or more streams of media content data, and can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a Spotify media content environment, most Spotify clients connect to various Spotify back-end processes via a Spotify "accesspoint", which forwards client requests to other servers, such as sending one or more metadataproxy requests to one of several metadataproxy machines on behalf of the client or end user.

Figure 2:
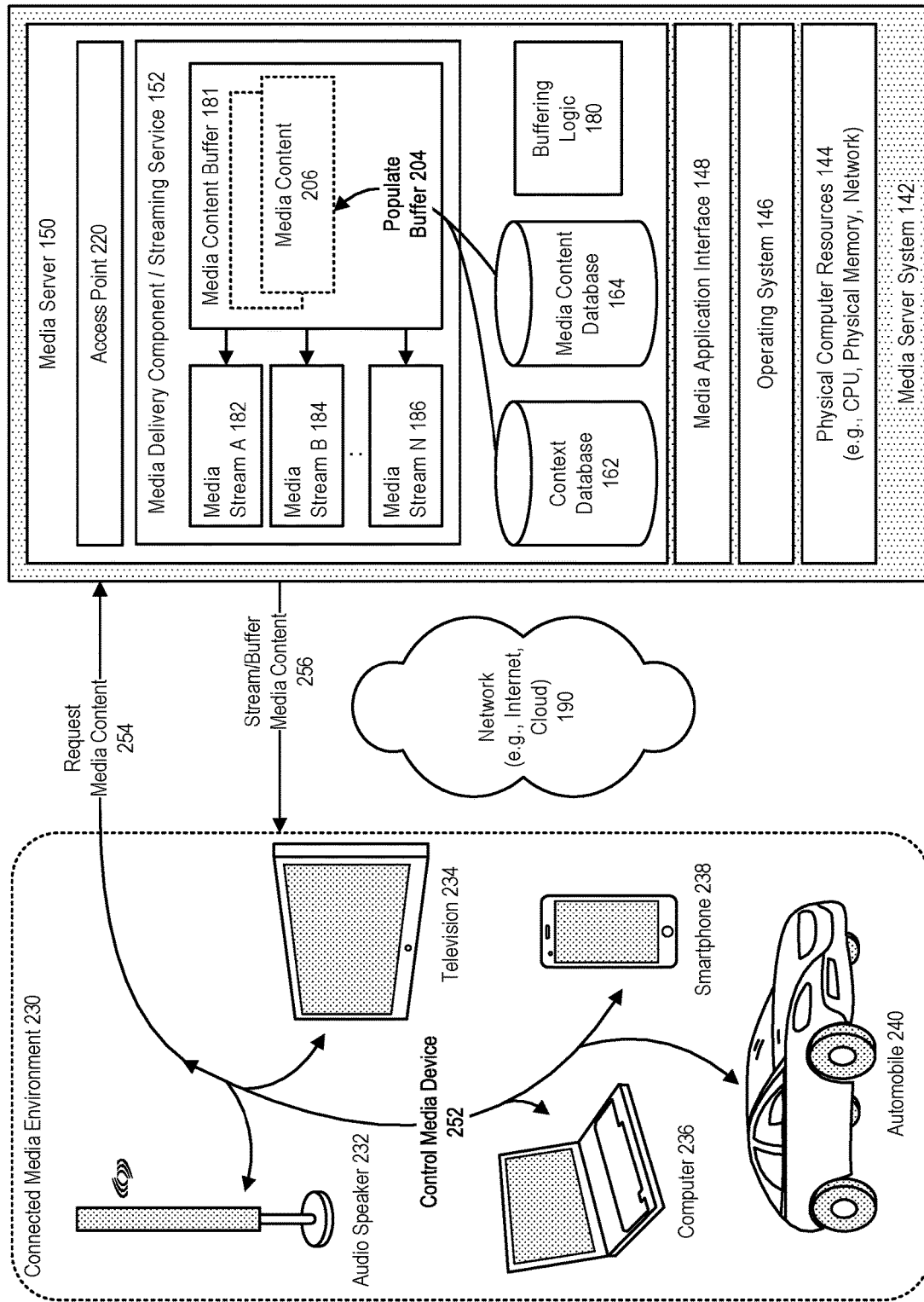
FIG. 2 further illustrates an example of a system for providing media content, in accordance with an embodiment.

FIG. 2 further illustrates an example of a system for providing media content, in accordance with an embodiment.

As illustrated in FIG. 2, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system for providing media content.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content, for example the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 3:
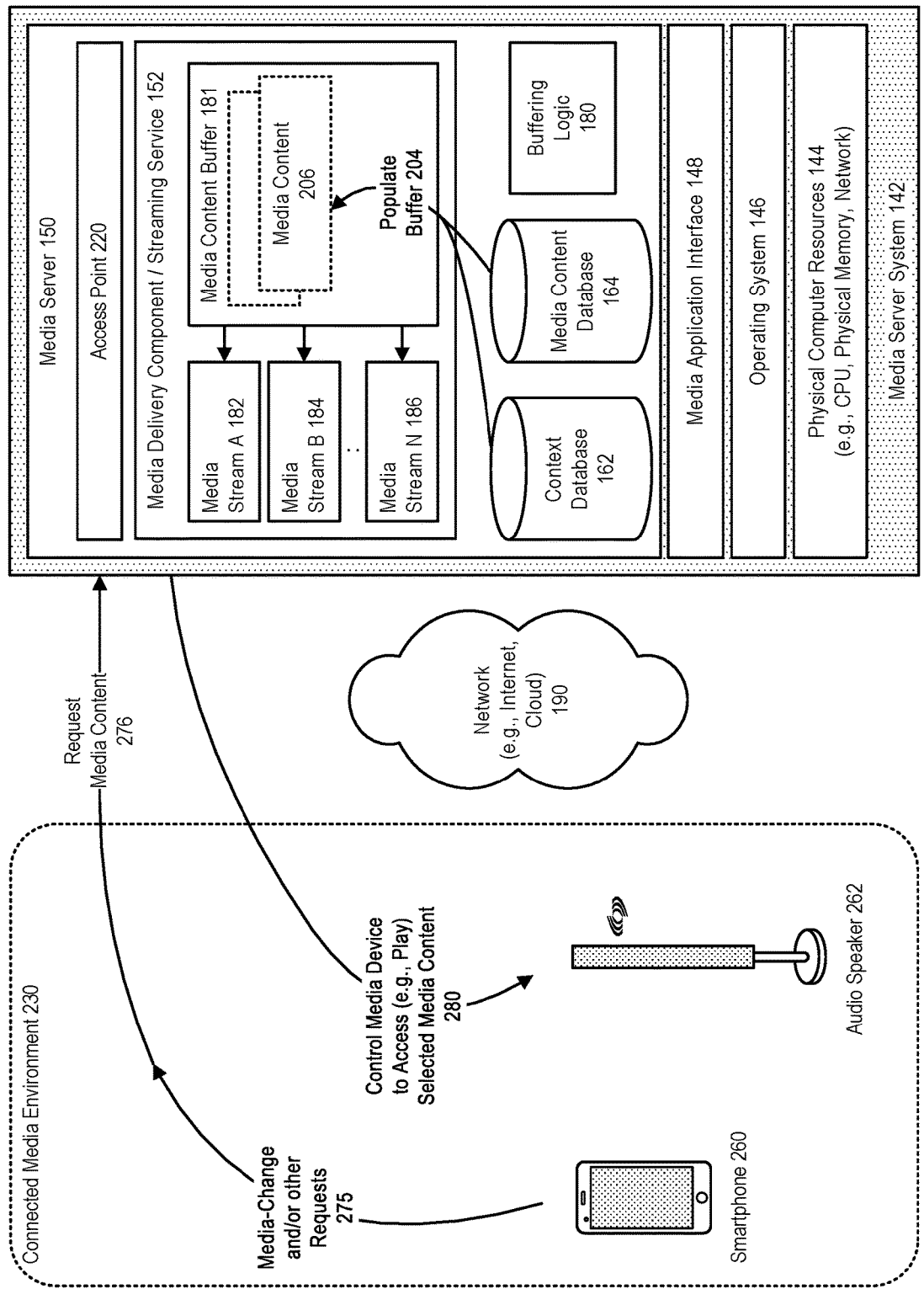
FIG. 3 further illustrates an example of a system for providing media content, in accordance with an embodiment.

FIG. 3 further illustrates an example of a system for providing media content, in accordance with an embodiment.

As illustrated in FIG. 3, a user can utilize, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

Client-Initiated Playlist Shuffle

As described above, in a media content environment which supports playlists of media content items, such as songs, music, videos, or other types of media content, whenever a user selects shuffled play of a number of media content items, for example within an artist page or a playlist, the resultant play order of those media content items should appear somewhat random. Additionally, the shuffling should be sufficiently stable so that, for example, the addition or deletion of songs to a playlist by another person actively curating that playlist, has minimal disruption on the listening experience.

For example, users may complain of hearing the same song multiple times before an entire playlist has finished playing. This can be due to a new shuffled order being generated after a user interaction, such as the user switching from one playlist to another, and back again, causing the original playlist to be reshuffled and ignoring what may have been played previously.

In other instances, the shuffling process can be overly sensitive to the addition or removal of songs from a playlist, such that a relatively small change to the playlist causes a completely different shuffled order.

These types of behaviors are generally undesirable for the user experience, including that they affect the user's ability to influence a shuffled order by choosing to have some songs play sooner than others; and also affect certain use cases, such as a new artist page in which it may make sense to play a particular artist's more popular songs first.

To address this, in accordance with an embodiment, described herein is a shuffling algorithm or method which addresses several desirable properties, including that it is:

stable (for example, removing, adding or moving a song within a playlist should not change the shuffled order of the rest of the playlist); and weighted (for example, certain songs can have a higher priority that makes them appear in the beginning of the shuffled playlist, and a play history can also be considered so that recently-played songs have a lower priority).

For a majority of users and use cases, a shuffling algorithm that is stable and weighted is generally more useful than one that is balanced (which might attempt to order multiple songs from an artist so they do not play too close to one other). Balance tends to affect stability—for example, if a song is added to a playlist that already includes many songs, there might not be sufficient room within the playlist to perform the reordering required to maintain balance, and hence the algorithm would no longer be stable. Additionally, when the algorithm is not stable, prefetching will keep fetching the wrong songs, and playback will stop.

Figure 4:
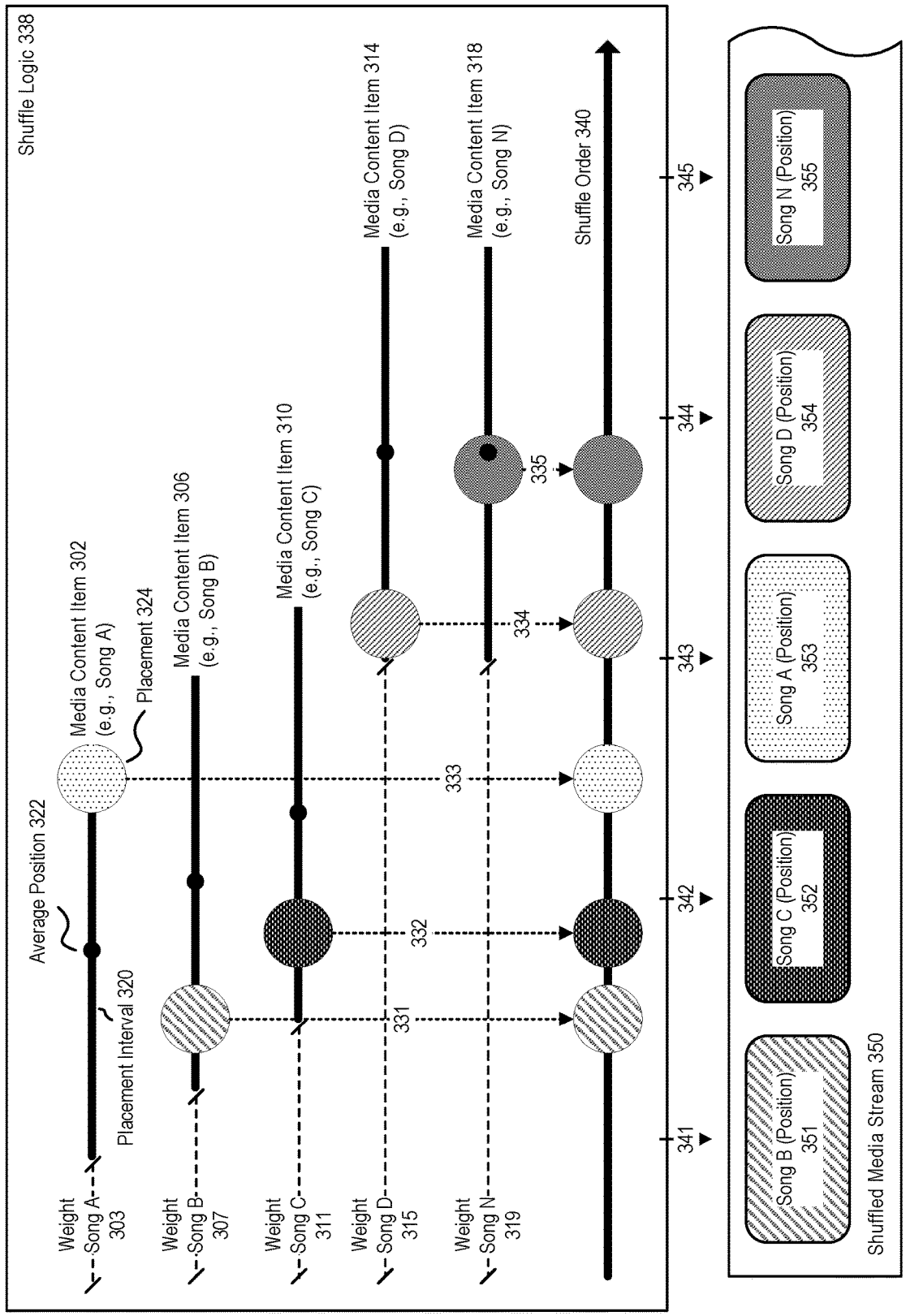
FIG. 4 illustrates a system for client-initiated playlist shuffle in a media content environment, in accordance with an embodiment.

FIG. 4 illustrates a system for client-initiated playlist shuffle in a media content environment, in accordance with an embodiment.

As illustrated in FIG. 4, in accordance with an embodiment, each song, music, video, or other type of media content item—for example media content items 302, 306, 310, 314, 318 corresponding to songs A, B, C, D, N respectively—can be associated with a placement interval data 320, having an average position 322 that can be indicated by a real number, and defining a placement interval within which the media content item can be placed 324. In accordance with an embodiment, the average position of the placement interval can be determined by a weight associated with each media content item—for example weights 303, 307, 311, 315, 319 corresponding to songs A, B, C, D, N respectively.

For example, as illustrated in FIG. 4, each of the songs A, B, C, D, and N can be viewed as a ball placed on a rod having a length or placement interval of 1 and whose middle represents the song's average position or weight within a shuffle order.

Although the illustrated example uses a plurality of songs, the technique can be similarly applied for use with a plurality of music, video, or other type of media content.

In accordance with an embodiment, each media content item is also associated with a random value that indicates a random offset or position within its placement interval. An ordering score can then be calculated for each media content item based on its weight plus its random offset into its placement interval.

For example, as illustrated in FIG. 4, each rod corresponding to a song can be positioned according to its weight, and each ball corresponding to that song can be randomly placed somewhere along its metal rod.

In accordance with an embodiment, the items of media content are then collected 331, 332, 333, 334, 335, to form a shuffle order 340 that reflects their random offsets or positions within their placement intervals, for example by collecting the media content items based on increasing ordering score.

For example, as illustrated in FIG. 4, even though song A (302) has the lowest average position by weight, in the shuffle order it is actually placed third, since in this example it was randomly positioned near the end of its placement interval (i.e., on the right side of its rod).

In accordance with an embodiment, stability can be achieved by using a position on the rod that depends only on the song and a global random seed which does not change when adding and removing tracks.

In accordance with various exemplary embodiments, the positional range or weight of each media option can be based, for example, on a popularity score weight, say between 0-5, based on the artist's most popular songs; or on a last-played weight between 0-1 calculated using a formula based on last time of play and playlist length. In accordance with other embodiment, other types of criteria can be used.

Once placed in a shuffle order, the ordered songs can then be placed 341, 342, 343, 344, 345, into a shuffled media stream 350 that includes each of the songs in their appropriate positions 352, 352, 353, 354, 355, for playback at a media device.

Figure 5:
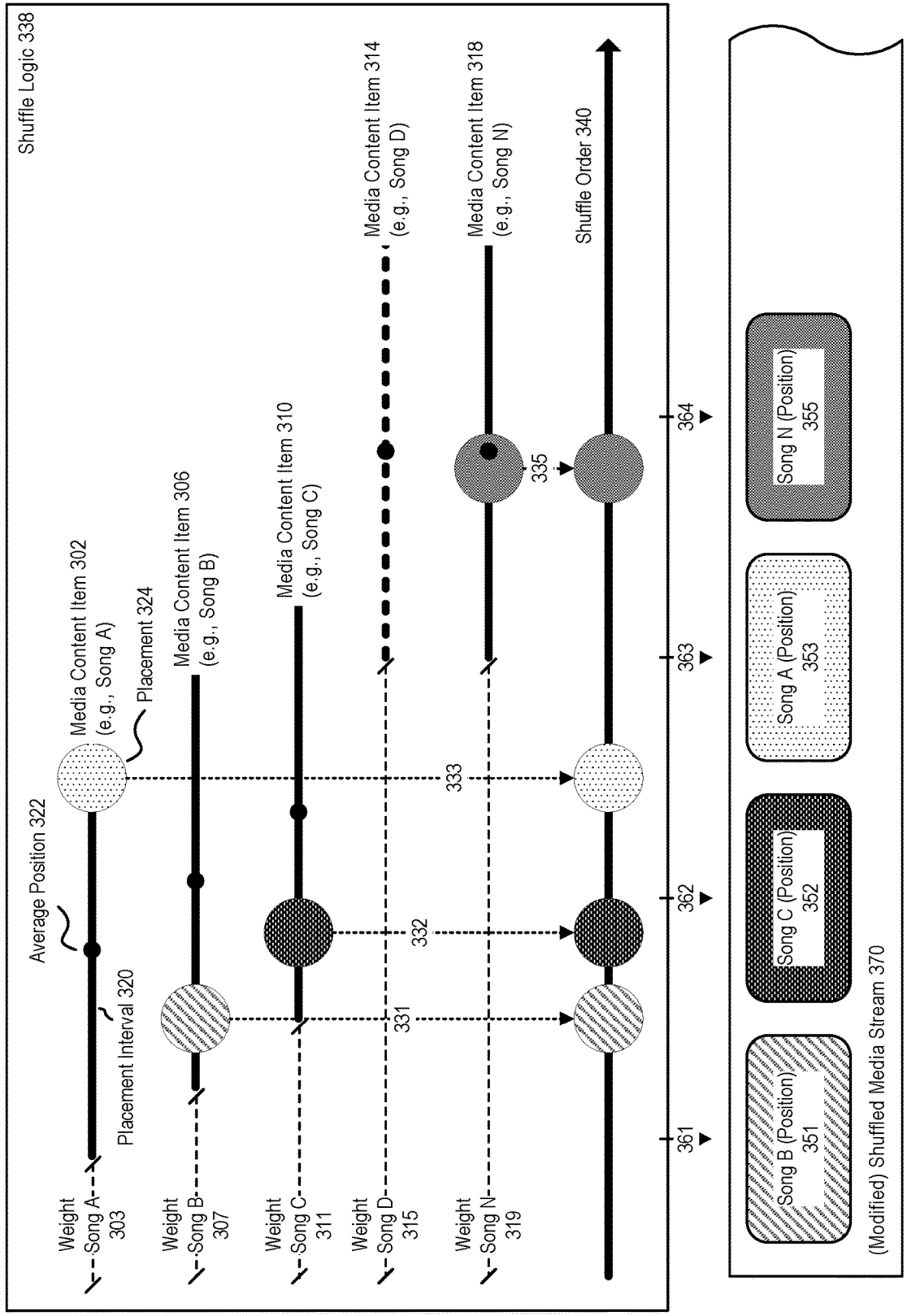
FIG. 5 further illustrates a system for client-initiated playlist shuffle in a media content environment, in accordance with an embodiment.

FIG. 5 further illustrates a system for client-initiated playlist shuffle in a media content environment, in accordance with an embodiment.

As illustrated in FIG. 5, in accordance with an embodiment, the shuffling result is shown after song D (314) has been removed (say, from a playlist). As illustrated in the figure, the four remaining songs remain at their same average positions as before, and the resulting shuffle order is also the same as before with song D removed.

Figure 6:
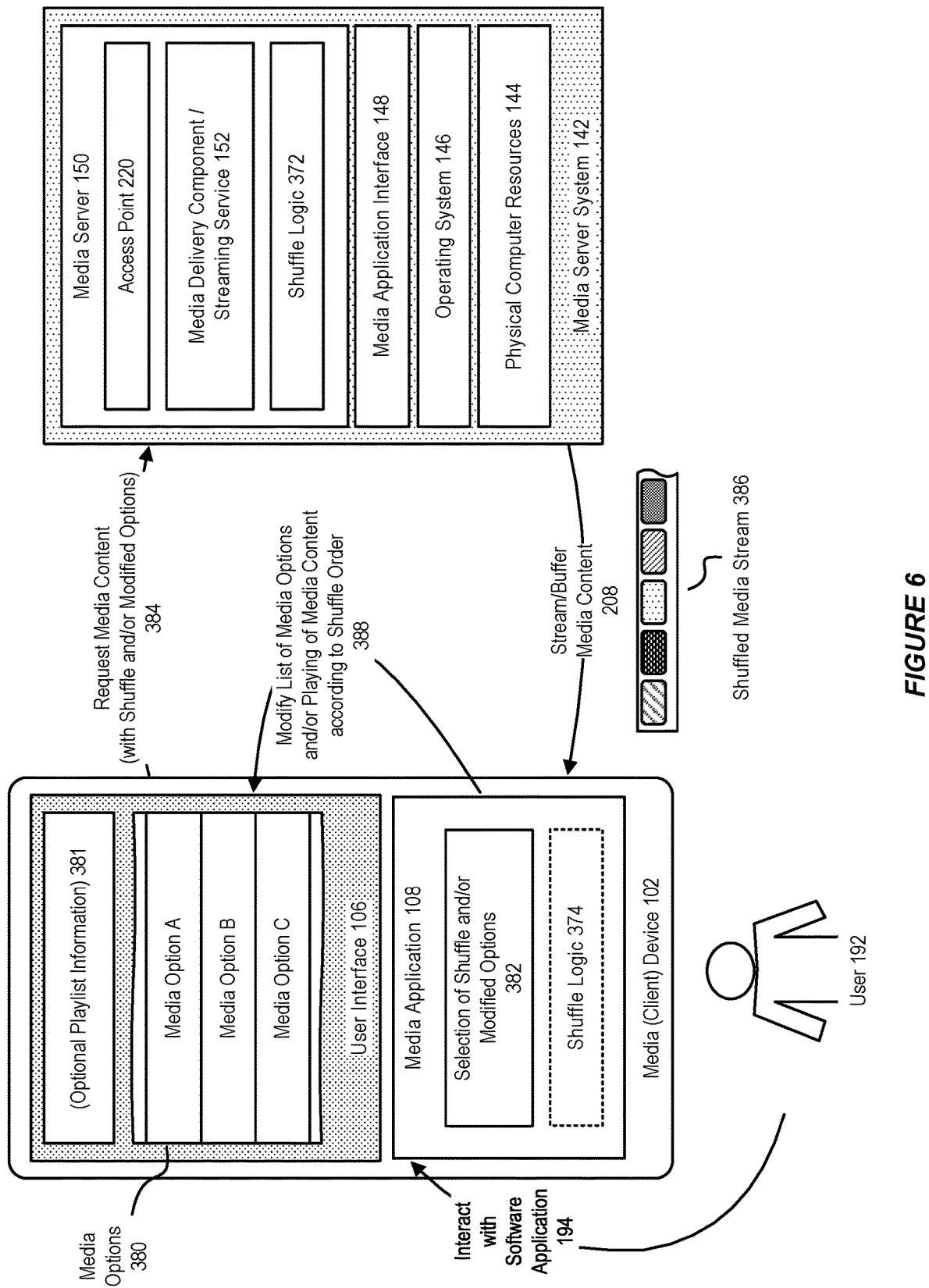
FIG. 6 further illustrates a system for client-initiated playlist shuffle in a media content environment, in accordance with an embodiment.

FIG. 6 further illustrates a system for client-initiated playlist shuffle in a media content environment, in accordance with an embodiment.

As illustrated in FIG. 6, in accordance with an embodiment, the media server can include a shuffle logic 372 configured to perform the above-described shuffling algorithm or method.

In accordance with an embodiment, a shuffle logic 374 configured to perform the above-described shuffling algorithm or method can alternatively be provided at the media device.

In accordance with an embodiment, the user interface at the media device can display a plurality or list of media options 380, for example as a playlist; and optionally a playlist information 381, such as a descriptive title. In response to a client-initiated selection of a shuffle and/or modified options 382, a corresponding request for media content 384 is provided to the server, and a shuffle media stream 386 is returned, in accordance with the above-described shuffling algorithm or method. The device and user interface can also be updated by modifying the list of media options, and/or playing media content according to a determined shuffle order.

In accordance with an embodiment, Example 1 illustrates an exemplary pseudocode that implements a shuffling algorithm or method.

As illustrated in Example 1, a shuffle function takes a weight function, a shuffle seed, and a list of media content items (e.g., song tracks), and shuffles them. Different weight functions can be used to address different use cases or produce different results: for example, a weight function can weigh tracks based on how recently they were played; or how popular they are; or apply no weight at all (which results in a pure random shuffle). As another example, in accordance with an embodiment, a shared history of plays from multiple clients can be used as a base for the weight function. In accordance with an embodiment, the shuffle seed is a number that should be the same if the same shuffle is desired, and can be changed, for example, when the user requests to shuffle-play a new playlist.

```
typealias WeightFunction = Track -> Number
/**
This function is the main algorithm. It takes a weight function, a shuffle
seed, and a list of tracks, and shuffles them.
*/
List<Track> shuffle(
    WeightFunction weightFunction,
    Number seed,
    List<Track> tracks) {
  Number hashTrackWithSeed(Track track) {
    // Not defined here; this is a hash function that hashes seed and track
    // together. Returns a number between 0..1
    //
    // This hash function needs to be picked with care, this algorithm's
    // shuffling is only as random as this hash function's output.
    ...
  }
  Number trackPosition(Track track) {
      return hashTrackWithSeed(seed, track) +
      weightFunction(track)
  }
  return tracks.sortBy(trackPosition)
}
```

Example 1

The shuffle function illustrated in Example 1 is provided for purposes of illustration, to illustrate an exemplary embodiment. In accordance with other embodiments, other types of functions can be used to provide a similar functionality.

In accordance with an embodiment, Examples 2-4 illustrate exemplary pseudocodes that implement various examples of weight functions which can be used in combination with a shuffle function as described above.

In particular, Example 2 illustrates an example of a weight function that applies no weight to media content items (e.g., tracks), which results in a uniformly random shuffle.

```
WeightFunction makeNullWeightFunction( ) {
    Number nullWeightFunction(Track track) {
      return 0
    }
    return nullWeightFunction
}
```

Example 2

Example 3 illustrates an example of a weight function that applies predetermined weights to media content items (e.g., tracks). This type of weight function can be used, for example, to weigh tracks based on track popularity, or how new a track is, or other properties. By providing a very low weight (e.g., at least 1 less than all other weights), the system can enforce a certain track to be played before all other tracks, which can be useful for introductory tracks.

Similarly it is possible to force some tracks to always be played after all other tracks, by giving them a weight that is, for example, at least 1 more than all other weights. This can be used if some tracks are considered less interesting, for example commentary tracks.

```
WeightFunction makeCustomWeightFunction(Map<Track, Number>
   weights) {
    Number customWeightFunction(Track track) {
      return weights[track]
    }
    return customWeightFunction
}
```

Example 3

Example 4 illustrates an example of a weight function that weighs media content items (e.g., tracks) based on recent listening history. The use if such a weight function makes it more likely that those tracks that the user has not listened to recently, are played earlier. An initial track list length (initialTrackListLength) indicates the number of tracks initially in the track list. For stability, the track list length value that the algorithm uses, should not change over the lifetime of the weight function. Because of this, the first track list length is stored, and this number is re-used later, even if it may have changed.

```
WeightFunction makeHistoryWeightFunction(
     Number initialTrackListLength,
     List<Track> playHistory) {
   Map<Track, Number> trackAges
   Number age = playHistory.length
   // Iterate in reverse so that more recent entries overwrite older ones.
   for (Track track : reverse(playHistory)) {
      trackAges [track] = age--
   }
   Number historyWeightFunction(Track track) {
     if (trackAges.contains(track)) {
        Number age = trackAges[track]
     } else {
        // The track has not been played recently. Assume that it
        was played
        // very long ago. This has the effect of weighting the track
        towards
        // the beginning of the shuffle order.
        Number age = playHistory.length
     }
     // If initialTrackListLength is too low, it can lead to
        strange
     // behavior if the user starts adding more songs to the track
        list.
     // We would then divide by a very small number leading to
        weights
     // that are too far from each other. In the end the shuffling
        order
     // will be almost completely determined by history. To
        avoid this,
     // pretend that the track list contains at least 5 tracks.
     // If the user does not add any tracks, the side effect of
        this is
     // that the history has less influence on the shuffle on
        track
     // lists with very few tracks than it would otherwise
        have.
     return -age / max(5, initialTrackListLength)
   }
   return historyWeightFunction
}
```

Example 4

The functions illustrated in Examples 2-4 are provided for purposes of illustration, to illustrate an exemplary embodiment. In accordance with other embodiments, other types of functions, for example other types of weight functions, can be provided to support various use cases.

As described above, the above approach to providing a shuffling algorithm or method generally trades balance in return for stability, since stability is generally more useful than balance, in terms of providing an enjoyable user experience.

Figure 7:
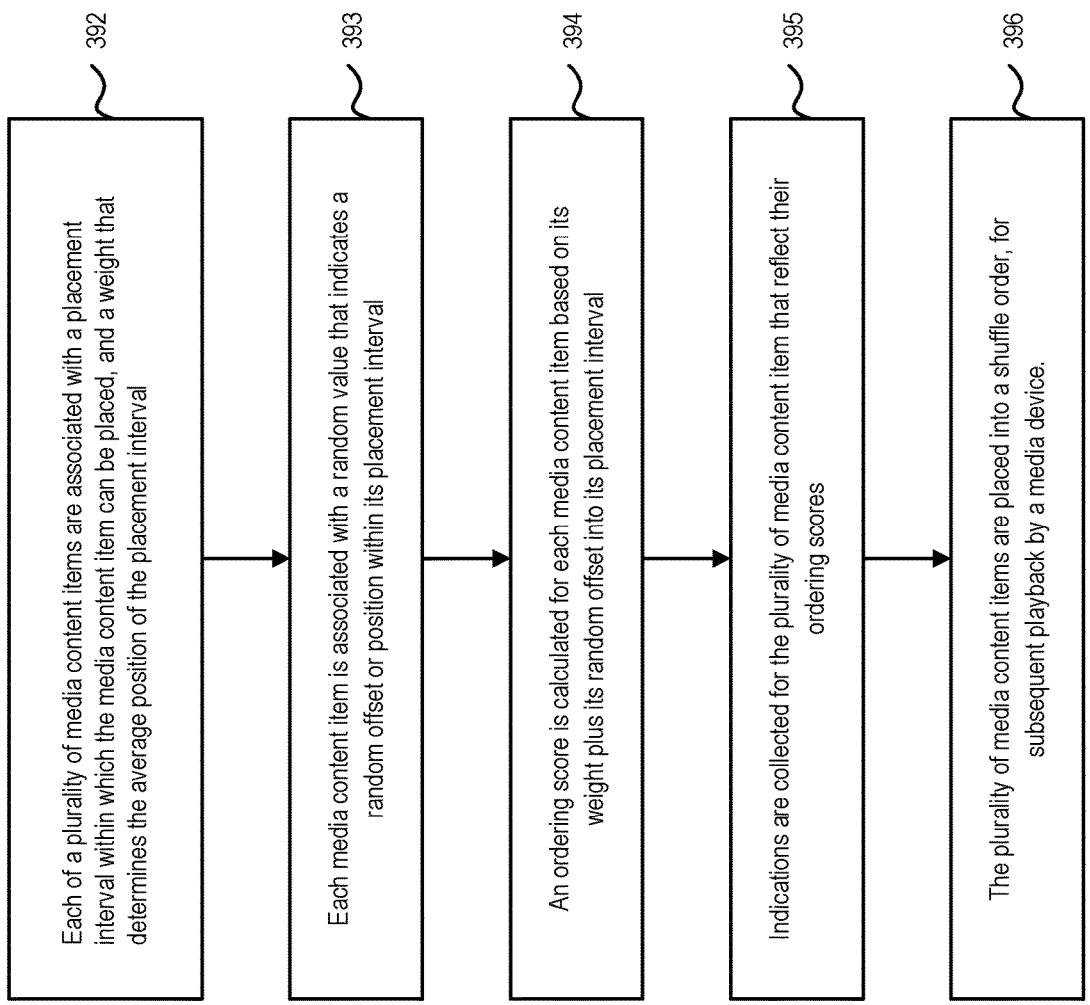
FIG. 7 illustrates a method for client-initiated playlist shuffle in a media content environment, in accordance with an embodiment.

FIG. 7 illustrates a method for client-initiated playlist shuffle in a media content environment, in accordance with an embodiment.

As illustrated in FIG. 7, in accordance with an embodiment, at step 392, each of a plurality of media content items are associated with a placement interval within which the media content item can be placed, and a weight that determines the average position of the placement interval.

At step 393, each media content item is associated with a random value that indicates a random offset or position within its placement interval.

At step 394, an ordering score is calculated for each media content item based on its weight plus its random offset into its placement interval.

At step 395, indications are collected for the plurality of media content item that reflect their ordering scores.

At step 396, the plurality of media content items are placed into a shuffle order, for subsequent playback by a media device.

Embodiments of the present invention may be conveniently implemented using one or more conventional general purpose or specialized digital computer, computing device, server, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

For example, while the techniques described above generally illustrate exemplary uses in media content environments, or music streaming services such as Spotify, for use in providing streamed music or other media content, the systems and techniques described herein can be similarly used with other types of systems, and/or for providing other types of data.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system, comprising:
   one or more processors; and
   a shuffle logic that is configured to provide a shuffle order for a plurality of media content items, including instructions for:
   associating a media content item with a weight that determines an average position of a placement interval within the shuffle order;
   associating the media content item with the placement interval within which the media content item can be placed;
   determining a random offset value within the placement interval;
   calculating an ordering score for the media content item based on its weight plus its random offset value;
   forming the shuffle order for the plurality of media content items, based on the ordering score; and
   providing the plurality of media content items in the shuffle order, for playback by a media device.

2. The system of claim 1,
   wherein the system including the shuffle logic is provided within the media device, wherein the media device operates as a client device and is configured to control playback of media content received from a media server;
   wherein the media device includes a user interface that enables a user to select from a plurality of media options for media content to be played at the client device or at a controlled client device; and
   wherein in response to receiving a request for a client-initiated shuffle, the shuffle logic, at the media device operating as a client device, shuffles the plurality of media content items prior to the plurality of media content items being played at the client device or at the controlled client device.

3. The system of claim 2, wherein each of the plurality of media options is associated with a media content item that is one of a song, music or other item of media content.

4. The system of claim 1,
   wherein the system including the shuffle logic is provided within a media server configured to receive requests for media content from the media device, wherein the media device operates as a client device and is configured to control playback of media content received from the media server; and
   wherein in response to receiving a request for a client-initiated shuffle, the shuffle logic, at the media server, shuffles the plurality of media content items prior to the plurality of media content items being provided for playback.

5. The system of claim 1, wherein the system is used in a media content environment that includes:
   the media device, wherein the media device operates as a client device and is configured to control playback of media content received from a media server, wherein the media device includes a user interface that enables a user to select from a plurality of media options for media content to be played at the client device or at a controlled client device; and
   a media server configured to receive requests for media content from the media device operating as a client device and configured to control playback of media content received from the media server;

wherein, in response to receiving a request for a client-initiated shuffle, the shuffle logic shuffles the plurality of media content items prior to the plurality of media content items being provided for playback.

6. A method for client-initiated playlist shuffle according to a shuffle order for a plurality of media content items, comprising:
associating a media content item with a weight that determines an average position of a placement interval within the shuffle order;
associating the media content item with the placement interval within which the media content item can be placed;
determining a random offset value within the placement interval;
calculating an ordering score for the media content item based on its weight plus its random offset value;
forming the shuffle order for the plurality of media content items, based on the ordering score; and
providing the plurality of media content items in the shuffle order, for playback by a media device.

7. The method of claim 6,
wherein the method is performed within the media device, wherein the media device operates as a client device and is configured to control playback of media content received from a media server;
wherein the media device includes a user interface that enables a user to select from a plurality of media options for media content to be played at the client device or at a controlled client device; and
wherein the method includes, in response to receiving a request for a client-initiated shuffle, at the media device operating as a client device, shuffling the plurality of media content items prior to the plurality of media content items being played at the client device or at the controlled client device.

8. The method of claim 7, wherein each of the plurality of media options is associated with a media content item that is one of a song, music or other item of media content.

9. The method of claim 6,
wherein the method is performed within a media server configured to receive requests for media content from the media device, wherein the media device operates as a client device and is configured to control playback of media content received from the media server; and
wherein the method includes, in response to receiving a request for a client-initiated shuffle, at the media server, shuffling the plurality of media content items prior to the plurality of media content items being provided for playback.

10. The method of claim 6, wherein the method is used in a media content environment that includes:
the media device, wherein the media device operates as a client device and is configured to control playback of media content received from a media server, wherein the media device includes a user interface that enables a user to select from a plurality of media options for media content to be played at the client device or at a controlled client device; and
a media server configured to receive requests for media content from the media device operating as a client device and configured to control playback of media content received from the media server;
wherein the method includes, in response to receiving a request for a client-initiated shuffle, shuffling the plurality of media content items prior to the plurality of media content items being provided for playback.

11. A non-transitory computer readable storage medium, including instructions stored thereon which when read and executed by a device that includes a processor, provide a shuffle order for a plurality of media content items, comprising:
associating a media content item with a weight that determines an average position of a placement interval within the shuffle order;
associating the media content item with the placement interval within which the media content item can be placed;
determining a random offset value within the placement interval;
calculating an ordering score for the media content item based on its weight plus its random offset value;
forming the shuffle order for the plurality of media content items, based on the ordering score; and
providing the plurality of media content items in the shuffle order, for playback by a media device.

12. The non-transitory computer readable storage medium of claim 11,
wherein the instructions are provided within the media device, wherein the media device operates as a client device and is configured to control playback of media content received from a media server;
wherein the media device includes a user interface that enables a user to select from a plurality of media options for media content to be played at the client device or at a controlled client device; and
wherein the instructions include instructions for, in response to receiving a request for a client-initiated shuffle, at the media device operating as a client device, shuffling the plurality of media content items prior to the plurality of media content items being played at the client device or at the controlled client device.

13. The non-transitory computer readable storage medium of claim 12, wherein each of the plurality of media options is associated with a media content item that is one of a song, music or other item of media content.

14. The non-transitory computer readable storage medium of claim 11,
wherein the instructions are provided within a media server configured to receive requests for media content from the media device, wherein the media device operates as a client device and is configured to control playback of media content received from the media server; and
wherein the instructions include instructions for, in response to receiving a request for a client-initiated shuffle, at the media server, shuffling the plurality of media content items prior to the plurality of media content items being provided for playback.

15. The non-transitory computer readable storage medium of claim 11, wherein the non-transitory computer readable storage medium is provided in a media content environment that includes:
the media device, wherein the media device operates as a client device and is configured to control playback of media content received from a media server, wherein the media device includes a user interface that enables a user to select from a plurality of media options for media content to be played at the client device or at a controlled client device; and
a media server configured to receive requests for media content from the media device operating as a client device and configured to control playback of media content received from the media server;

wherein, the instructions include instructions for in response to receiving a request for a client-initiated shuffle, shuffling the plurality of media content items prior to the plurality of media content items being provided for playback.

\* \* \* \* \*